(12) United States Patent
Chan et al.

(10) Patent No.: US 11,703,744 B2
(45) Date of Patent: Jul. 18, 2023

(54) CLAMP WITH IMPROVED RETAINING STRUCTURE

(71) Applicant: Really Right Stuff, LLC, Lehi, UT (US)

(72) Inventors: Verent Chan, Lehi, UT (US); Joseph M. Johnson, Sr., Lehi, UT (US)

(73) Assignee: Really Right Stuff, LLC, Lehi, UT (US)

(*) Notice: Subject to any disclaimer, the term of this patent is extended or adjusted under 35 U.S.C. 154(b) by 58 days.

(21) Appl. No.: 17/474,865

(22) Filed: Sep. 14, 2021

(65) Prior Publication Data

US 2022/0260896 A1 Aug. 18, 2022

Related U.S. Application Data

(60) Provisional application No. 63/149,018, filed on Feb. 12, 2021.

(51) Int. Cl.
| | | |
|---|---|---|
| *F41C 23/00* | (2006.01) | |
| *G03B 17/56* | (2021.01) | |
| *F16M 11/04* | (2006.01) | |
| *F16B 2/18* | (2006.01) | |
| *F41A 23/02* | (2006.01) | |

(52) U.S. Cl.
CPC ............ *G03B 17/561* (2013.01); *F16B 2/185* (2013.01); *F16M 11/041* (2013.01); *F41A 23/02* (2013.01)

(58) Field of Classification Search
CPC ..... G03B 17/561; G03B 17/566; F16B 2/185; F16B 5/0657; F16B 2/12; F16M 11/041; F16M 2200/028; F41A 23/02
See application file for complete search history.

(56) References Cited

U.S. PATENT DOCUMENTS 5,404,182 A 4/1995 Nomura
6,773,172 B1 * 8/2004 Johnson ................. F16M 13/00
396/428

(Continued)

FOREIGN PATENT DOCUMENTS

EP 3064823 A1 9/2016
WO 2012119709 A1 9/2012

OTHER PUBLICATIONS

United States Patent and Trademark Office; International Search Report and Written Opinion for Int'l. App. No. PCT/US2022/015839 dated May 4, 2022; 7 pages.

(Continued)

*Primary Examiner* — Amy J. Sterling
(74) *Attorney, Agent, or Firm* — Chernoff, Vilhauer, McClung & Stenzel, LLP

(57) ABSTRACT

An apparatus for engaging equipment to a support includes a member defining a first channel having a first side wall capable of lateral movement with respect to a second side wall suitable for engaging the equipment therebetween. The member defines a pair of surfaces suitable for engaging equipment thereon. A movable member is capable of causing the lateral movement. A substantially compressible member is operably interconnected between the movable member and the first side wall. A pin is selectively raisable with respect to one of the surfaces within a peripheral area defined by the one of the surfaces.

15 Claims, 27 Drawing Sheets

(56) References Cited

U.S. PATENT DOCUMENTS

| | | | |
|---|---|---|---|
| 7,739,824 B1* | 6/2010 | Swan | F41G 11/003 |
| | | | 42/71.01 |
| 8,438,965 B2* | 5/2013 | Collin | F41G 11/003 |
| | | | 89/125 |
| 8,499,484 B2* | 8/2013 | Schneider | F41G 1/387 |
| | | | 340/505 |
| 9,371,958 B2 | 6/2016 | Johnson et al. | |
| 10,883,650 B2 | 1/2021 | Johnson, Sr. et al. | |
| 11,085,736 B2* | 8/2021 | Johnson, Sr. | F41G 11/003 |
| 2013/0015649 A1 | 6/2013 | Li et al. | |
| 2013/0163978 A1 | 6/2013 | Carlesso | |
| 2015/0323858 A1 | 11/2015 | Stephens et al. | |
| 2016/0202022 A1 | 7/2016 | Gao et al. | |
| 2016/0266601 A1 | 9/2016 | Christensen et al. | |
| 2017/0261841 A1 | 9/2017 | Johnson, Sr. | |
| 2017/0337789 A1 | 11/2017 | Rosenkvist | |
| 2018/0164662 A1 | 6/2018 | Olmos-Calderon | |
| 2018/0320813 A1 | 11/2018 | Karman et al. | |
| 2021/0108892 A1* | 4/2021 | Ma | F41C 27/00 |
| 2022/0390816 A1* | 12/2022 | Speggiorin | F16M 11/043 |

OTHER PUBLICATIONS

United States Patent and Trademark Office; International Search Report and Written Opinion for Int'l. App. No. PCT/US2022/015837 dated May 24, 2022; 9 pages.

\* cited by examiner

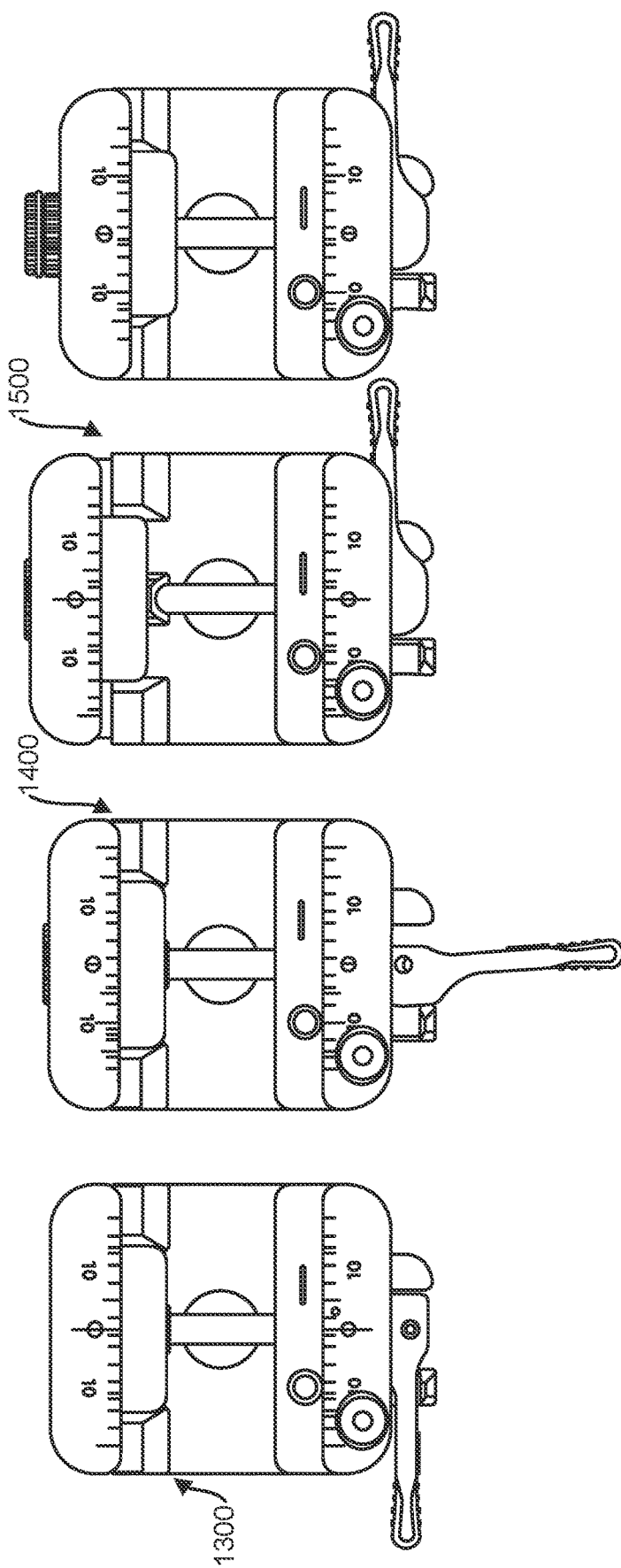

CLAMP WITH IMPROVED RETAINING STRUCTURE

CROSS REFERENCE TO RELATED APPLICATIONS

This application claims the benefit of U.S. Provisional Patent Application No. 63/149,018 filed Feb. 12, 2021.

BACKGROUND

The subject matter of this application relates to a clamp.

Photographic equipment may be mounted to a camera stand in a variety of ways. Some camera bodies, for example, have threaded sockets in their base so they can be directly mounted to a bolt that extends upwardly from the support. The camera body is positioned over the support so that the bolt fits within the socket and the camera body is spun around several times to screw the camera body to the support. Alternatively, and particularly when a heavy, elongate camera lens is attached to a camera body, the camera lens will include a support having a threaded socket positioned below the lens so that the lens may be mounted to the support in the same manner as a camera body.

These methods take an appreciable amount of time and require care to ensure that the threads of the stud are properly aligned with the threads in the socket. Further, there is often insufficient time to screw the camera body or lens to the tripod before a particular shot should be taken. This lack of time requires that the camera either be held in-hand, potentially resulting in image blur from the shake of the hand, or that the shot be missed altogether.

These difficulties can be reduced by using a quick-release clamp to mount photographic equipment to a support. Such quick-release clamps are typically designed to screw onto the bolt of the support while the photographic equipment is releasably secured to the upper surface of the clamp so that it can quickly be secured to, or released from, the support. To secure photographic equipment to such a quick-release clamp, the photographic equipment such as a camera body will typically include two parallel, opposed rails extending from its base. The opposed rails may be provided by the equipment or in the form of a plate secured to the equipment. The rails are spaced apart so that they fit within an upwardly facing channel defined by the clamp. The clamp includes a lever that moves between two positions to adjust the spacing between the side walls of the channel so that, when in a first, locking position, the channel grips the rails connected to the camera system and when in a second, released position, the channel disengages the rails so that the photographic equipment may be lifted from the clamp. In this manner, the lever may be used to quickly secure or release the photographic equipment from the support.

It is therefore desired to provide a clamp for easily, quickly, and securely mounting photographic equipment to a support.

BRIEF DESCRIPTION OF THE DRAWINGS

For a better understanding of the invention, and to show how the same may be carried into effect, reference will now be made, by way of example, to the accompanying drawings, in which:

FIG. 13 illustrates the clamp of FIG. 7 in a closed position.

FIG. 14 illustrates the clamp of FIG. 7 in a sliding position.

FIG. 15 illustrates the clamp of FIG. 7 in an opened position.

FIG. 16 illustrates the nut of the clamp of FIG. 7 in a retracted position.

DETAILED DESCRIPTION

Figure 1:
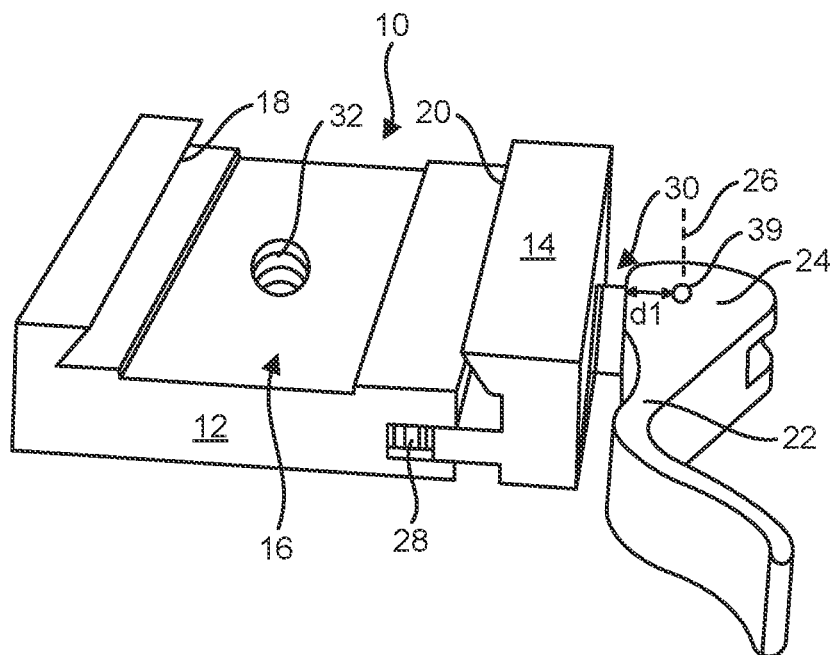
FIG. 1 illustrates a clamp that includes a lever.

FIG. 1 shows a clamp 10 that comprises a body 12 and an adjustable arm 14 that together form a channel 16 having opposed side walls 18 and 20. The body 12 may define an opening 32 through which the clamp 10 may be secured to the upper portion of a tripod or other support. The adjustable arm 14 is slidably engaged along the cantilevered portion 59 of a stud 36 (shown in FIG. 6) securely mounted in the body 12. Movement of the adjustable arm 14 selectively adjusts the width of the channel 16 and is accomplished through manual operation of a lever 22 fastened to the distal end 60 of the stud 36. The lever 22, attached to the adjustable arm 14, permits quick adjustment of the spacing between the side walls 18 and 20 so that the channel 16 may selectively either grip or release a pair of rails attached to the base of a camera body (not shown). Each respective side wall 18 and 20 is preferably angled upward and inward to facilitate engagement with such rails. In this manner, photographic equipment may be quickly engaged or released from a tripod or other support.

Figure 4:
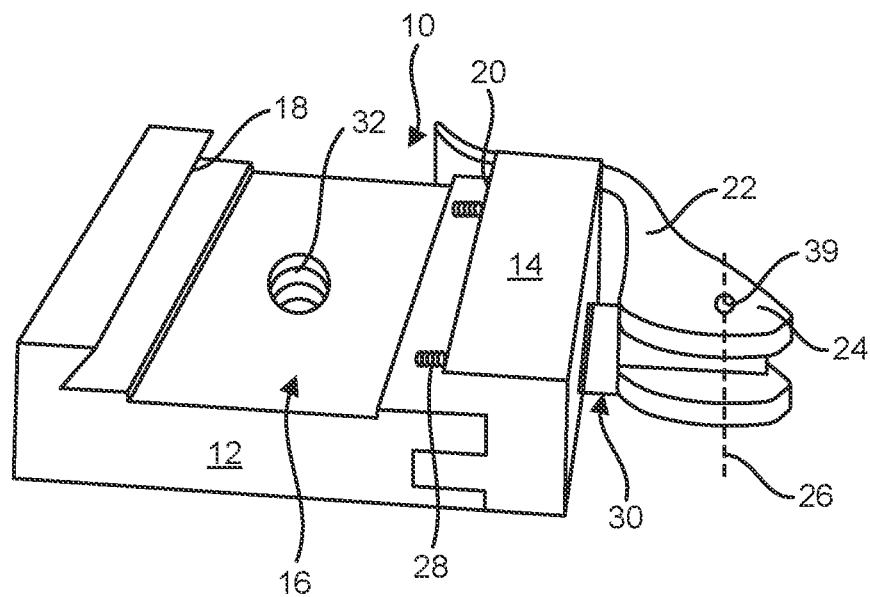
FIG. 4 illustrates the lever of the clamp in an engaged position.

The lever 22 may be a cam lever that includes a cam portion 24 that rotates about a pivot axis 26 as the cam lever is moved between a first, unlocked position (shown in FIG. 1) and a second, locked position (shown in FIG. 4). The cam portion 24 has an asymmetrical shape about the pivot axis 26 so that the lever 22 pushes the adjustable arm 14 inward as the lever 22 is moved from a first position for releasing photographic equipment from the clamp 10 to a second position for gripping photographic equipment to the clamp 10. Conversely, as the lever 22 is moved from the second position to the first position, a pair of counterforce springs 28, housed within the body 12, push outward on the adjustable arm 14 so that the channel 16 expands.

Figure 6:
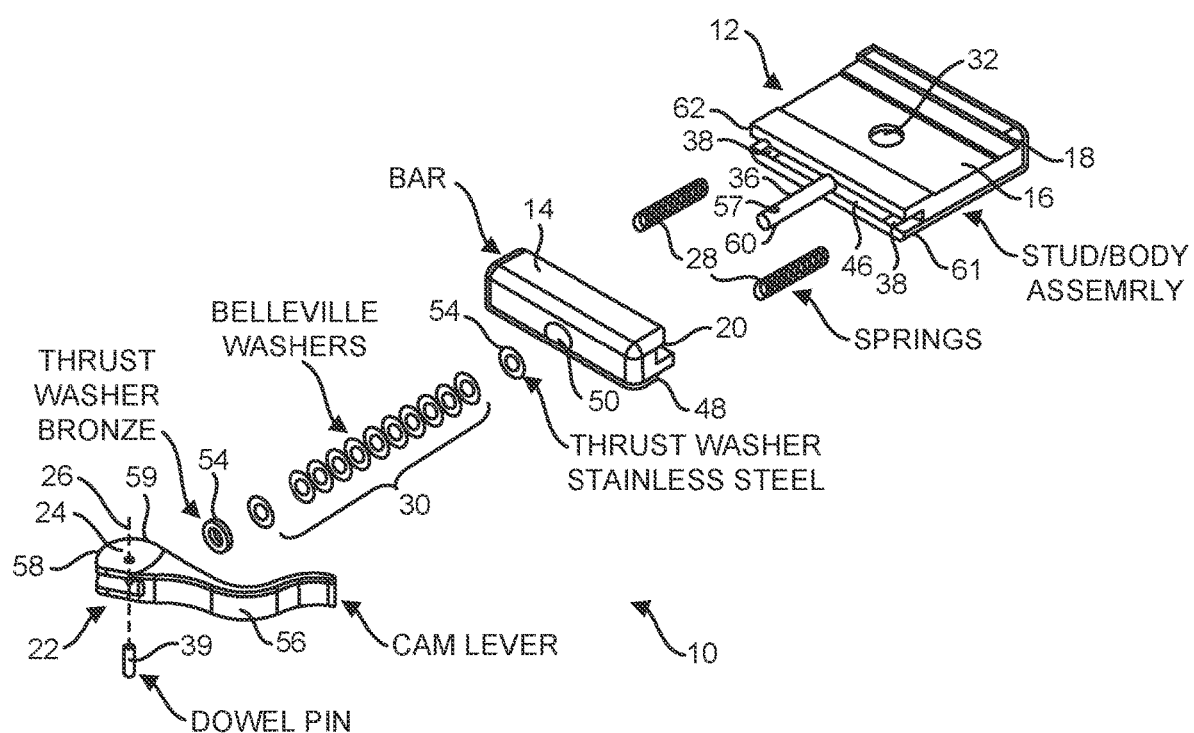
FIG. 6 illustrates an exploded view of the clamp of FIG. 1.

The outwardly directed force applied by the springs 28 on the adjustable arm 14 is at a maximum when the lever 22 is in the second position, i.e., when the channel 16 is intended to grip photographic equipment. The force applied by the springs 28 therefore acts to loosen the grip on the photographic equipment. The clamp 10 includes a locking member 30 that prevents any outward movement of the adjustable arm 14 that might otherwise result from the force applied by the springs 28. The locking member 30 may be substantially compressible, such as a compression spring, and interposed between the lever 22 and the adjustable arm 14. FIG. 6, for example, shows a series of Belleville washers 30 that together operate as a compression spring. Alternatively, the locking member 30 could be a helical compression spring or any other appropriate force generating member. Further, the locking member 30 may be interposed between the adjustable arm 14 and the body 12. The locking member 30 may preferably apply an inwardly-directed force on the adjustable arm 14 that increases as the lever 22 is moved from the first position towards the second position. The inward force applied on the adjustable arm 14 by the locking member 30 may preferably be greater than the outward force applied by the springs 28 when the lever 22 is in the second position. Also, the lever 22 may include an over-center detent position.

The manner in which clamp 10 may be operated is seen in reference to FIGS. 1-4. FIG. 1 shows the clamp 10 where the lever 22 is in the first position, i.e., the released position. In this first position, the adjustable arm 14 is spaced apart from the body 12 by an applied force from the springs 28, thus widening the channel 16 to allow the insertion or removal of photographic equipment. The cam portion 24 is oriented such that the locking member 30, which in this instance is a series of Belleville washers that act as a compression spring, is sufficiently relaxed so as to not apply a sufficient inward force on the adjustable arm 14 to overcome the outward force of the springs 14. In this position, the cam portion 24 preferably abuts the locking member 30 at a minimum distance d1 from the pivot axis 26. As the lever 22 is moved from the first position toward the second position, the cam portion 24 pushes the locking member 30 and the adjustable arm 14, inward. The locking member 30 begins to compress to counterbalance the outward force of the springs 28 applied to the adjustable arm 14 as it moves inward.

Figure 2:
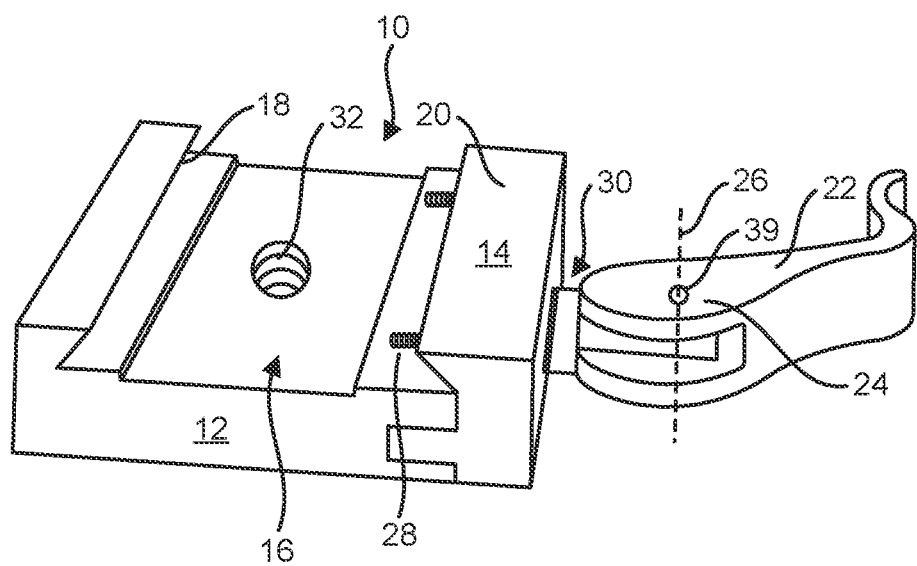
FIG. 2 illustrates the lever of the clamp in a first intermediate position.

FIG. 2 shows the lever 22 in a first intermediate position where the lever 22 has been moved to a position where the adjustable arm 14 is flush with the body 12. In this position, the forces applied by the locking member 30 and the springs 28 counterbalance each other; further movement of the lever 22 towards the second position, however, causes the inward force applied by compression of the locking member to increase over that of the springs 28 because the adjustable arm 14 may not move any further while the locking member 30 will continue to compress.

Figure 3:
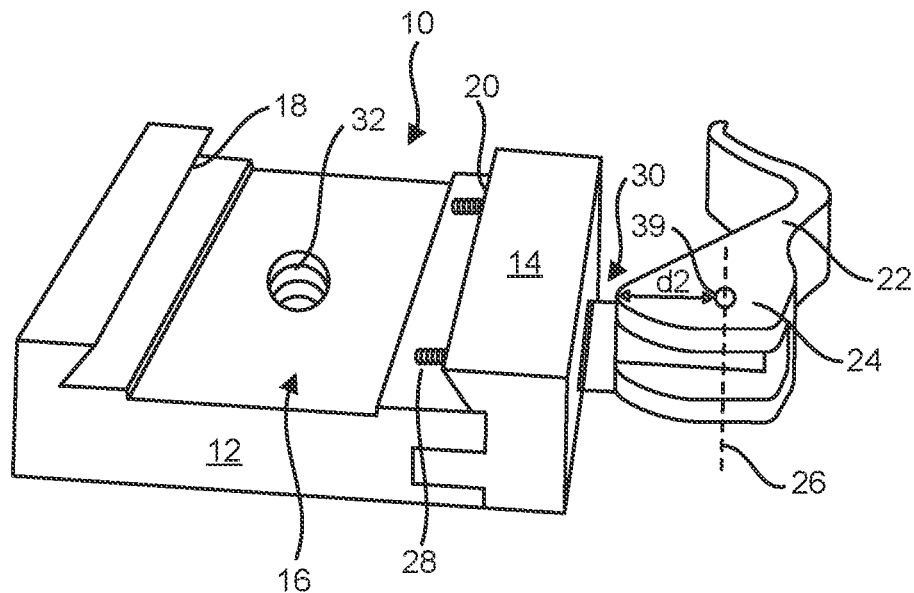
FIG. 3 illustrates the lever of the clamp in a second intermediate position.

FIG. 3 shows the lever 22 in a second intermediate position where the locking member 30 is applying a maximum inward force on the adjustable arm 14. This is a position where the cam portion 24 preferably abuts the locking member 30 at a maximum distance d2 from the pivot axis 26. In this position, the inward force applied by the locking member 30 to the adjustable arm 14 is substantially greater than the outward force applied by the springs 28. Further movement of the lever 22 toward either the first or second position will relax the locking member 30 with respect to the maximum inward force as the distance from the pivot axis 26 on which the locking member 30 abuts the cam portion 24 decreases.

FIG. 4 shows the lever 22 in the second position. In this position, the lever 22 is in an over-center detent configuration such that movement of the lever 22 toward the first position will act to compress the locking member 30. Thus, the locking member 30 resists movement of the lever 22 toward the first position. Preferably, when in this position, the inward force applied by the locking member 30 to the adjustable arm 14 is still greater than the outward force applied by the springs 28. Alternatively, the two forces could be precisely counterbalanced. In this manner, the adjustable arm 14 is locked into place because the springs 28 do not apply a sufficient force to overcome that force applied by the locking member 30.

The locking member 30 preferably applies a force to the adjustable arm 14 and the lever 22 that varies with the position of the lever 22. The force preferably increases as the lever is moved from the first position towards the second position. The force preferably reaches a maximum before the lever reaches the second position. More preferably, the force applied by the locking member 30 is less than that maximum when in the second position, so that the force applied by the locking member also increases as the lever is moved from the second position towards the first position.

Figure 5:
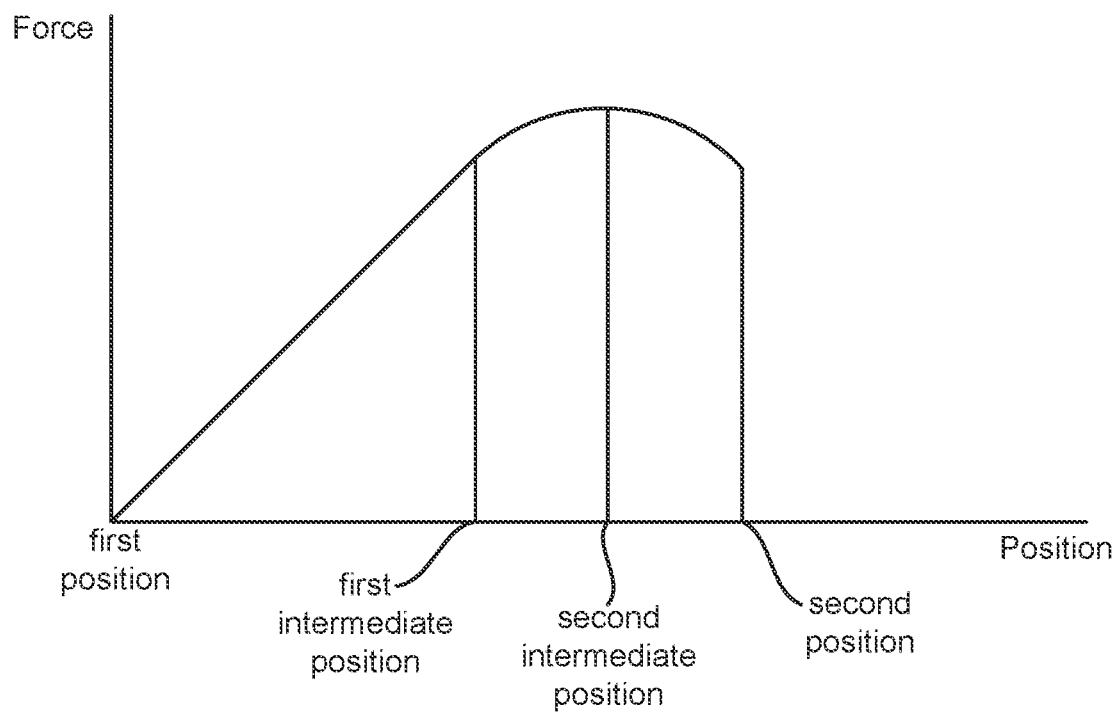
FIG. 5 illustrates a force profile generated by the clamp.

The locking member 30 together with the lever 22 may, for example, achieve a force profile generally depicted in FIG. 5. This figure indicates that as the lever 22 is moved over a range of motion extending from the first position to the second position, the force increases to a maximum at a second intermediate position and then decreases as the lever 22 continues to the second position.

It should also be noted from this figure FIG. 5 the adjustable arm 14 may cease its inward motion at a first intermediate position before the locking member has reached its maximum force. This may be preferable so that the inward force applied by the locking member 30 on the adjustable arm 14, when the lever is in the second position, can still overcome the outward force applied by the springs 28 even though the force applied by the locking member 30 has fallen from its maximum. It should be further noted that the movement of the adjustable arm 14 corresponds to the movement of the lever. Also, the maximum force may be at the end of the movement range of the lever.

The force profile depicted in FIG. 5 is smooth, i.e., as the lever is moved from the first position, the force increases continuously to a maximum and decreases continuously until the lever reaches the second position. Alternative embodiments may design a lever that permits the force profile to decrease at certain intervals on the lever's path from the first position to the second intermediate position of maximum force, or to increase on the lever's path from that second intermediate position to a lesser force at the second position, or both.

Though the force profile depicted in FIG. 5 is achieved by using a lever 22 in conjunction with the locking member 30, it should be understood that levers of other shapes may be used to achieve the same or similar force profiles. Further, other structures may be substituted for the lever, such as a plunger or a button or a screw.

Referring to FIG. 6, the clamp 10 may comprise a body 12 constructed of any sufficiently rigid material such as metal, plastic, or composite material. The body 12 preferably defines the side wall 18 of the channel 16 as well as a central opening 32 by which the clamp 10 may be secured to a tripod or other support using a bolt, pin, or other similar protrusion. The opening 32 may be threaded to receive a bolt, or alternately may not be threaded such that interconnection with a tripod or other support may be made using a wing nut or other fastener.

The body 12 may also define a sleeve into which the stud 36 may be inserted. The stud 36 and the sleeve are preferably threaded to ensure a rigid connection. If further means are desired to ensure a rigid connection between the stud 36 and the body 12, they may each define aligned holes and through which a fastening pin may be inserted. Alternatively, a thread locking compound may be used. The body preferably also defines two symmetrically opposed sockets 38 into which the springs 28 may be inserted. The sockets 38 and the sleeve may also preferably be parts of a slot 46 defined by the body 12.

The adjustable arm 14 preferably defines the side wall 20 as well as a ledge 48 sized to fit snugly within the slot 46. The springs 28, when inserted into their respective sockets 38 will push on the ledge 46 as the adjustable arm is engaged with the body 12. The adjustable arm 14 may also define a partially bored opening 50 so that the opening 50 may simultaneously retain the locking member 30 within itself while permitting the stud 36 to extend completely through the adjustable arm 14.

The locking member 30 may comprise a plurality of adjacent Belleville washers that together function as a compression spring. Optionally, a thrust washer 54 may be located at either or each end of the plurality of Belleville washers.

The lever 22 may comprise a handle portion 56 and a yoke 58. The yoke 58 may also define the cam portion 24 that operates the locking member 30 as the lever 22 is rotated. The yoke 58 preferably receives the distal end 60 of the stud 36. The stud 36 may be secured to the yoke 58 using a dowel pin 39 that is inserted into aligned openings formed by the stud 36 and the yoke 58, respectively.

While a lever clamp provides a quick release mechanism for securing devices to the lever clamp, with substantial device weight being secured by the lever clamp tends to result in slippage of the device or otherwise becoming inadvertently disengaged. Without careful handling of the lever clamp, the lever may become inadvertently released, thereby releasing whatever is being secured by the lever clamp. Also, the lever clamp provides a friction-based position retention using a set of one or more Belleville springs together with a cam lever profile, but the level of friction force tends to vary depending on manufacturing tolerances. For higher forces, such as a rifle recoil, the maximum frictional force provided by the lever clamp may be insufficient to safely and reliably provide a sufficient force to maintain a device from slipping out of a set position. To adjust the friction provided by the lever clamp may also require difficult adjustment mechanisms to accommodate various sizes of the rails, or otherwise, that as secured thereto.

Figure 7:
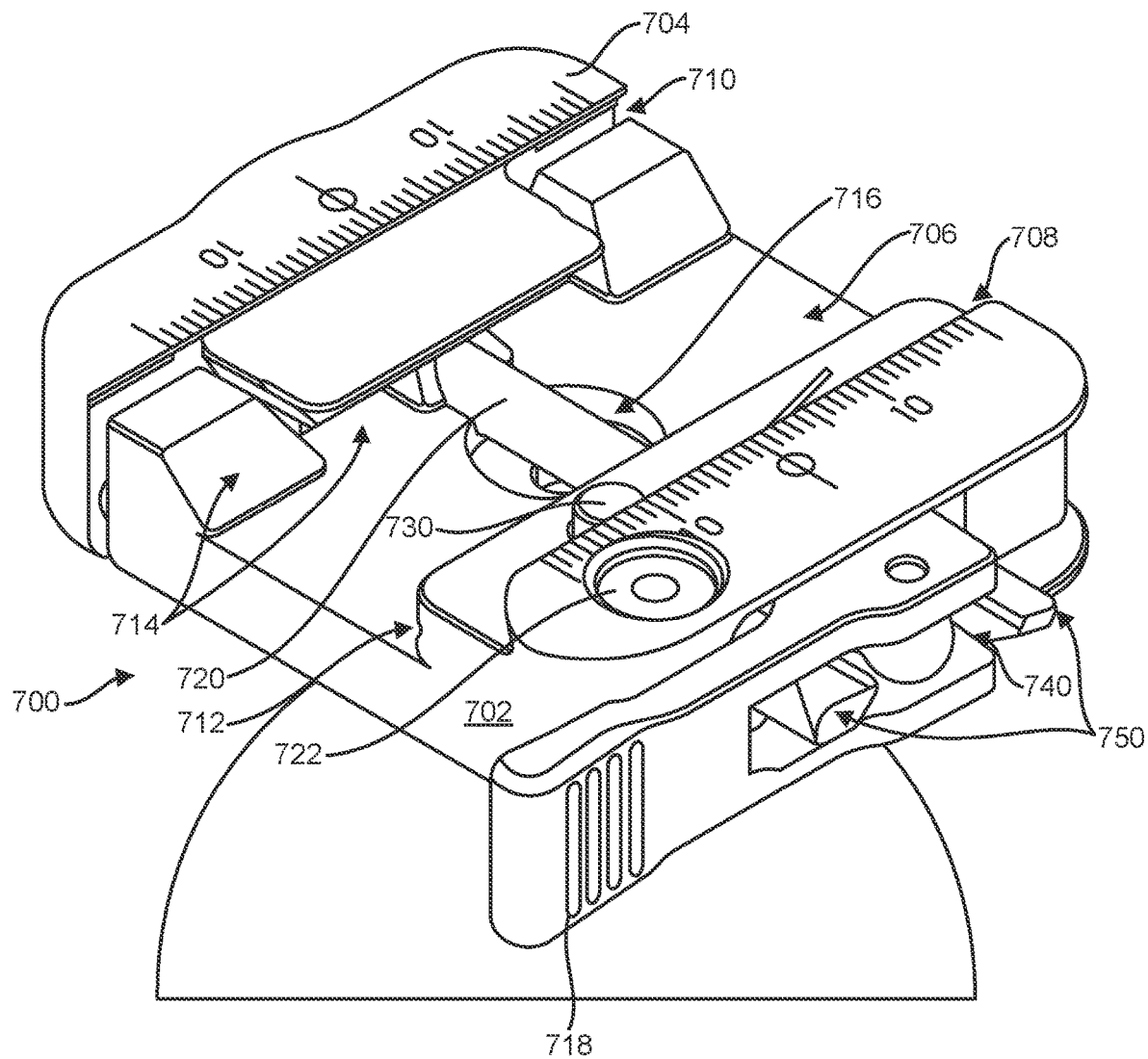
FIG. 7 illustrates a modified clamp with a pin.

Referring to FIG. 7, a modified clamp may include a clamp 700 that comprises a body 702 and an adjustable arm 704 that together form a channel 706 having opposed upper side walls 708 and 710 and/or lower side walls 712 and 714. The body 702 may define an opening 716 through which the clamp 700 may be secured to the upper portion of a tripod, a ball head, or other support with a screw. The adjustable arm 704 is slidably engaged using a lever 718 and a shaft 720 passing through the body 702. Movement of the adjustable arm 704 selectively adjusts the width of the channel 706 and is accomplished through manual operation of the lever 718 fastened to the distal end of the shaft 720. The lever 718 engaged with the adjustable arm 704, permits quick adjustment of the spacing between the side walls so that the channel 706 may selectively either grip or release a pair of rails attached to the base of a camera body, rifle, or other device. Each respective side wall is preferably angled upward and inward to facilitate engagement with such rails. In this manner, a device may be quickly engaged or released. The body may also include a level bubble 722 in an upper surface thereof.

Figure 8:
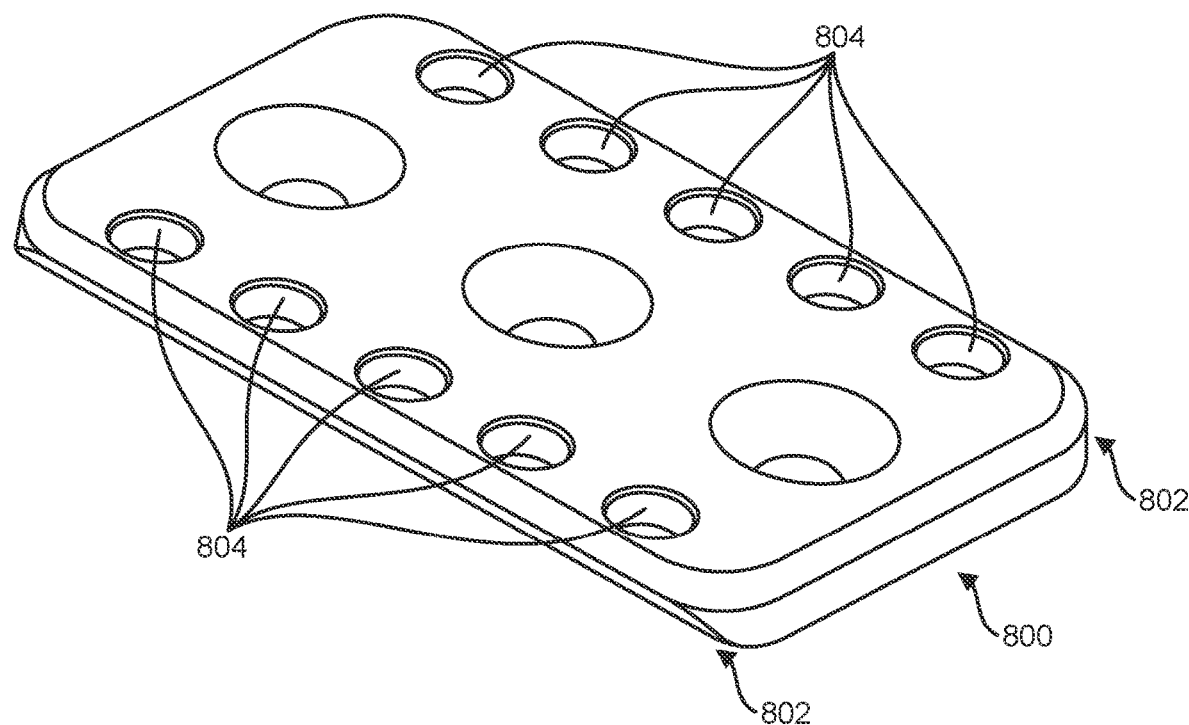
FIG. 8 illustrates a modified plate for the clamp of FIG. 7.
Figure 9:
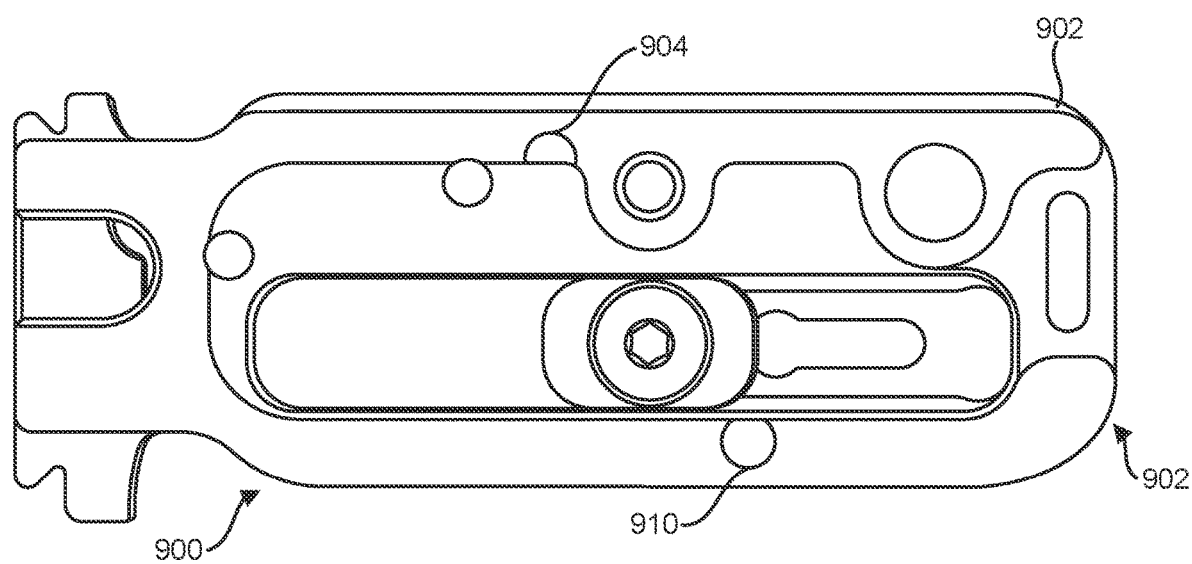
FIG. 9 illustrates a modified bracket for the clamp of FIG. 7.

To provide additional securement to devices secured therebetween, the clamp 700 preferably includes a pin 730 selectively extending proud from one of the supporting surfaces of the clamp 700. The pin 730 may be biased upwardly, such as based upon a spring, or otherwise the pin 730 may be raised and lowered in response to an adjustment mechanism. The pin 730 may have any desired profile, such as oval, round, rectangular, square, or otherwise. There may be a plurality of pins 730 selectively extending proud from one or more of the supporting surfaces of the clamp 700. Referring to FIG. 8, a plate 800 with inclined edges 802 may include one or more openings 804 defined therein sized and positioned such that when engaged with the clamp 700, the pin(s) 730 extend at least partially through the corresponding opening(s) 804. Referring to FIG. 9, a bracket 900 with inclined edges 902 may include one or more openings 904 defined therein sized and positioned such that when engaged with the clamp 700, the pin(s) 730 extend at least partially through the corresponding opening(s) 904. As it may be observed, with the plate 800/bracket 900 engaged with the clamp 700 and the clamp 700 in a locked position securing the plate 800/bracket 900 therein, together with the pin(s) 730 engaged by the opening(s) 804/opening(s) 904, the plate 800/bracket 900 together with anything supported therein is maintained from slipping. Preferably, the pin(s) 730 may be manually depressed so that the top of the pin(s) 730 are flush with the respective surface to accommodate a plate/bracket that does not include a suitable opening therein to engage with the pin(s). In this manner, the clamp 700 may support structures that include suitable openings to engage the pin(s) 730 and structures that to not include suitable openings to engage the pin(s) 730. Alternatively, the clamp may include a pin that extends in from the side of the clamp within the channel area, which engages with openings defined by the side of the plate/bracket/or otherwise secured therebetween.

Figure 10:
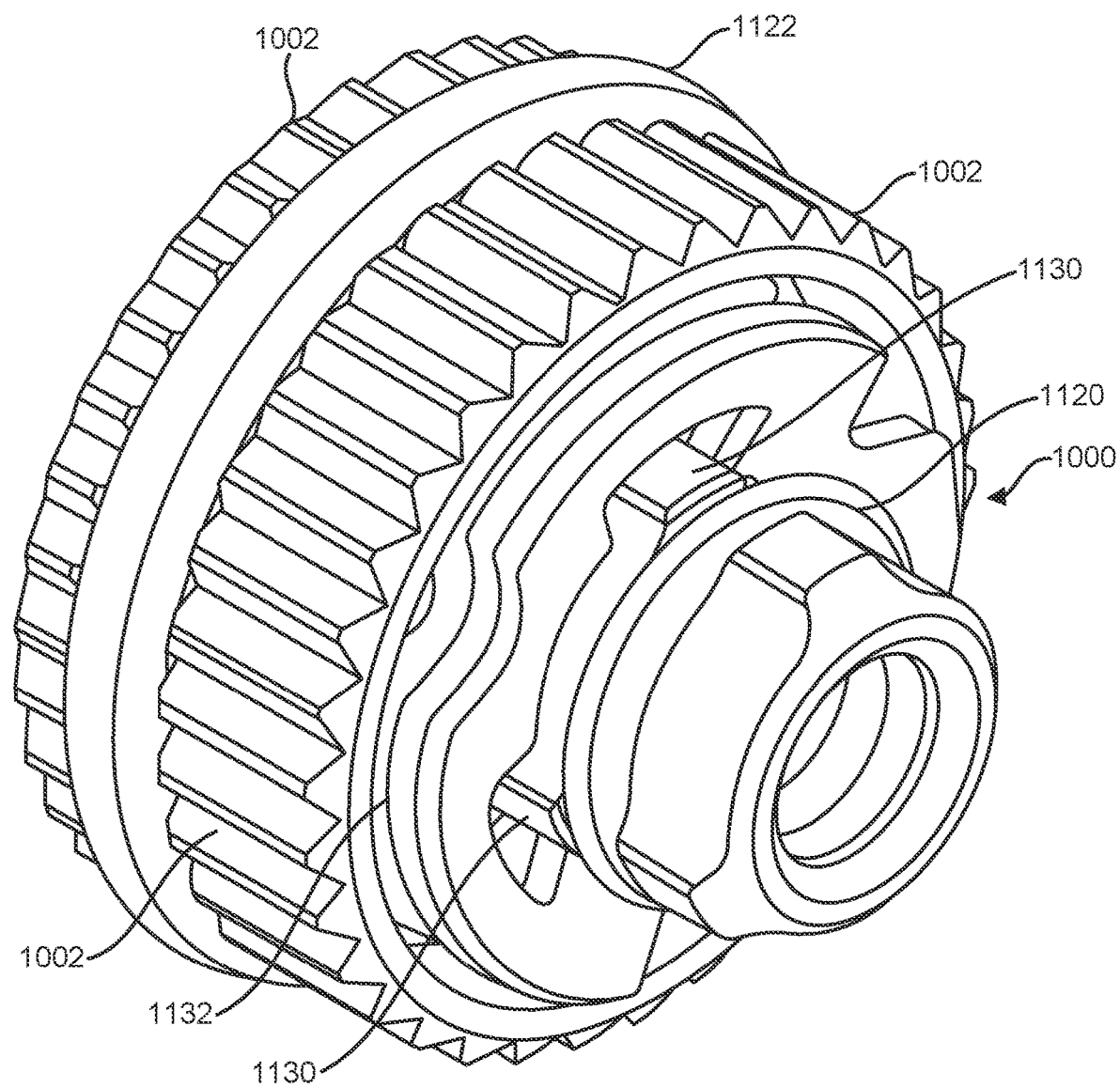
FIG. 10 illustrates a nut for the clamp of FIG. 7.

Referring to FIG. 10, rotation of the lever 718, or movement of a knob or otherwise, changes the position of the shaft 720 which is interconnected with a corresponding nut

1000. The nut 1000 applies a spring force to the adjustable arm 704 in combination with the body 702, such that when the lever is in a "closed" position, there is positive pressure being applied to the device secured therein. It is to be understood that the adjustable arm 704 and/or the nut 1000 may be repositioned to the same side of the body 702 as the lever, if desired. The nut 1000 may include a serrated profile 1002, such as 34 teeth, that engages with a serrated profile defined by the adjustable arm 704. The nut 1000 may be disengaged from the adjustable arm 704, rotated either to effectively shorten the operative length of the shaft 720 or to effectively lengthen the operative length of the shaft 720 to modify the position of the adjustable arm 704 with respect to the shaft 720. After rotation of the nut 1000, the nut is again engaged with the adjustable arm 704 with the serrated profile 1002 inhibiting it being freely rotatable. The clamp 700 may further include a set of one or more springs, shown below, that permits effective modification of the force applied by the clamp in relatively small increments. provides a fine adjustment but also locks the selected setting in place during use.

Figure 11:
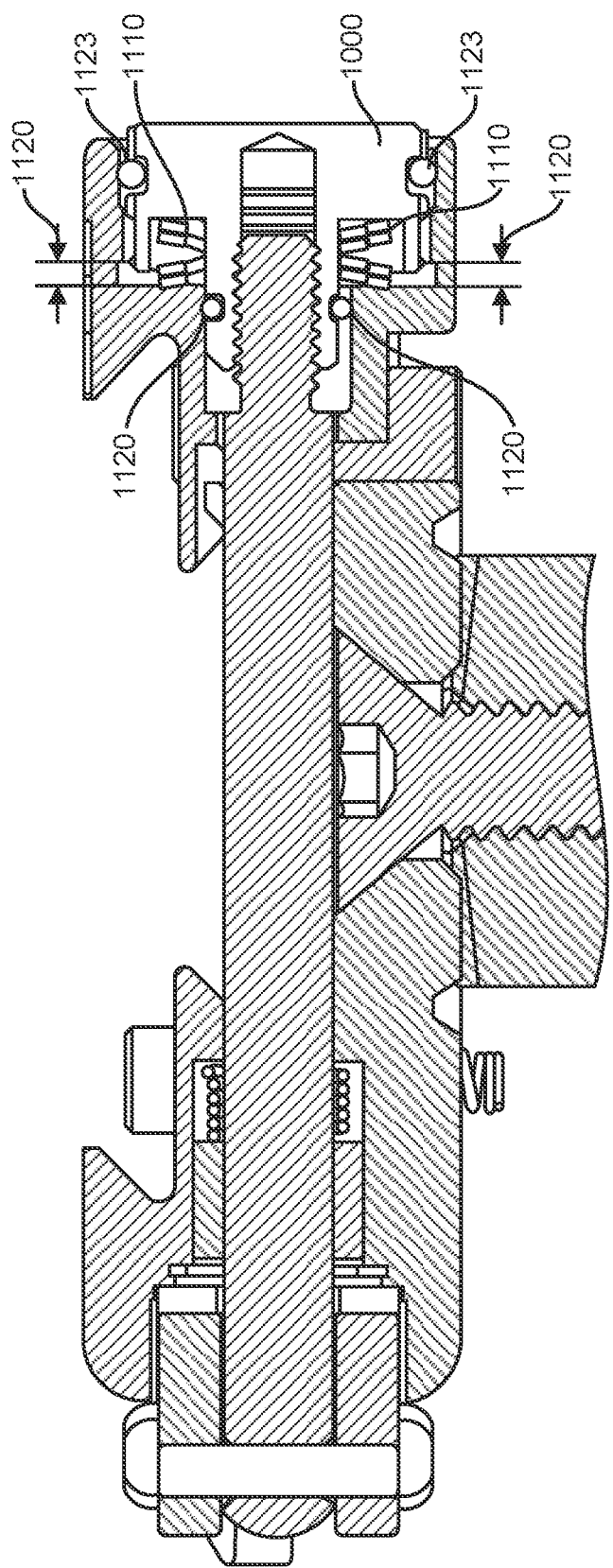
FIG. 11 illustrates a cross sectional view of the clamp of FIG. 7.
Figure 12:
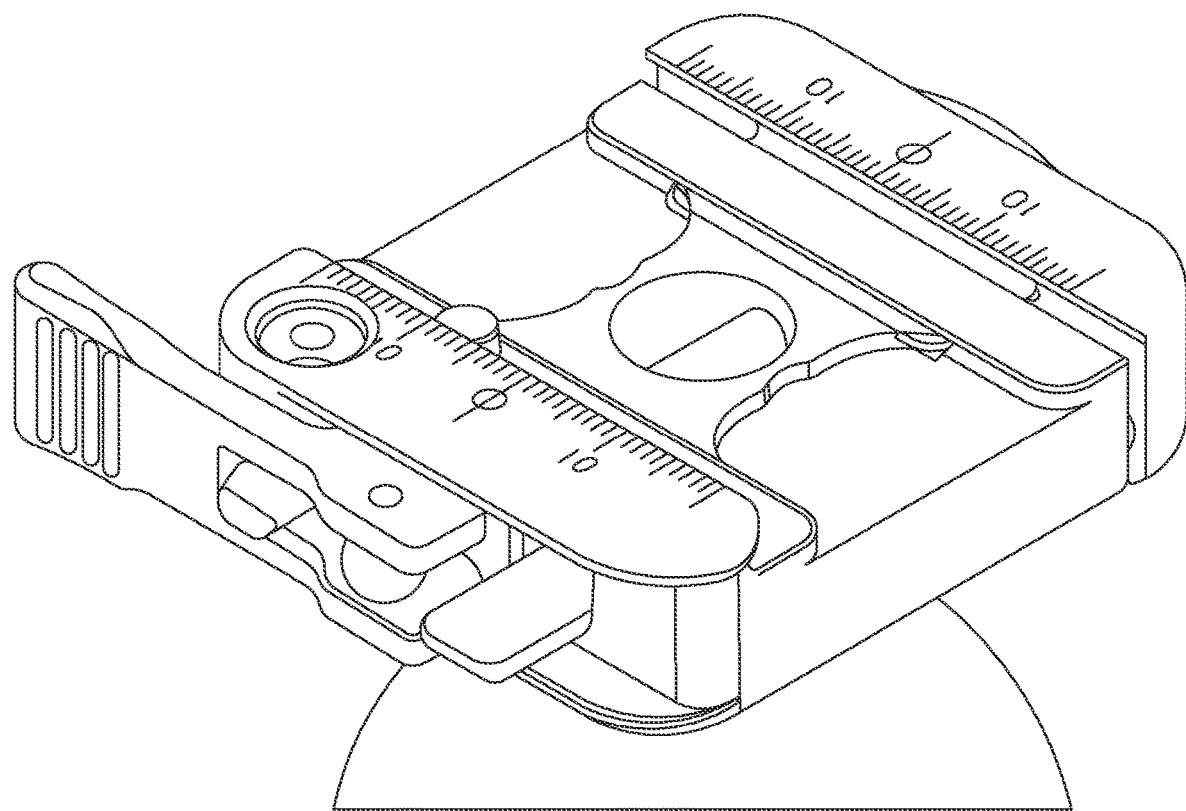
FIG. 12 illustrates another exemplary clamp.

Referring also to FIG. 11, the nut 1000 may also act as a spring compression limiter, inhibiting the user from over-tightening the clamp and thereby permanently deforming the springs. For example, a pair of springs 1110 may be included in the clamp 700, with the nut 1000 limiting the compression so that a small gap 1123 remains between the nut 1000 and the adjustable arm 704. The nut 1000 may include a pair of O-rings 1120, 1122 that inhibit contaminates from the spring mechanism while also inhibiting the springs from falling off during disassembly. The nut 1000 may include a tri-lobe structure 1130 that inhibits rotation of clover-shaped disc springs 1132, while also increasing the retention of the O-ring 1120. It is noted that the shaft 730 may act as a recoil lug for NATO/Picatinny rail, such as described in U.S. Pat. No. 10,883,650, incorporated by reference herein. It is noted that the shaft 730 may be included within the body 702 such that it doesn't extend above a clamping surface. It is noted that the dual clamping levels may be replaced by a single level, such as described in U.S. Pat. No. 6,773,172, incorporated by reference herein. Referring to FIG. 12, an exemplary clamp without dual clamping levels, nor Picatinny compatibility is illustrated, that retains the pin(s) structure.

Referring again to FIG. 11 and to FIGS. 13-15, the surfaces of the clamp 700 include three distinct planes, that, when combined with one or more springs, provides for vibration resistance. The three planes correspond with three positions of the jaw, namely, a closed position 1300 (see FIG. 13), a sliding position 1400 (see FIG. 14), and an opened position 1500 (see FIG. 15).

Referring again to FIG. 7, the lever 718 includes an elongate slit 740 that interfaces with a latching assembly 750. The latching assembly 750 inhibits inadvertent opening of the lever from the closed position 1300, to the sliding position 1400 or opened position 1500. The latch assembly 750 may be configured such that requires two (or more) distinct user inputs to permit uninhibited movement of the lever 718. First the latch assembly 750 is depressed, and then second, while maintaining the latch assembly 750 depressed, the lever 718 is rotated to the sliding position 1400 or opened position 1500. Preferably the latch assembly 750 also acts to articulate the pin(s) 730. Also, the latch assembly 750 does not need to articulate the pin(s) 730, if desired. It is noted that the latch assembly 750 is preferably rotating on an axis different than, such as perpendicular to, the axis of the lever 718. The elongate slit 740 may support other functions, described later. Moreover, the lever 718 is preferably configured in such a manner that the lever 718 cannot be flipped 180 degrees and operate in reverse direction as a result of the position and function of the latch in combination with the indexing pin(s) mechanism.

Figure 17:
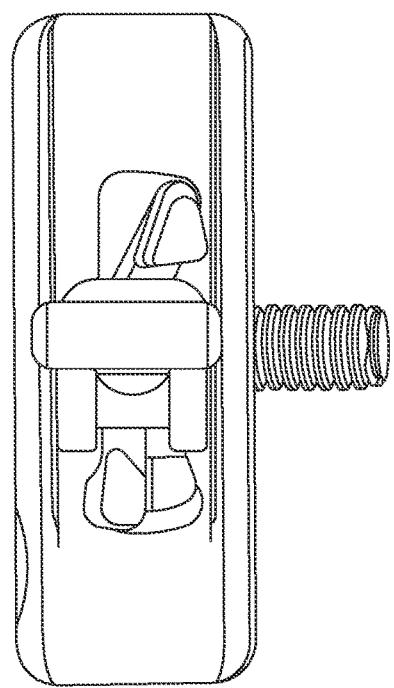
FIG. 17 illustrates the lever and clamp assembly in the closed position.

Referring to FIG. 17, the lever 718 is shown in the closed position 1300 with the latch assembly 750 extending through the elongate slit 740 and inhibiting opening of the lever 718. Also, in the closed position 1300, the lever 718 inhibits the latch assembly 750 from rotating sufficiently to depress the pin(s) 730. This inhibits accidental disengagement of the pin(s) 730 when it is desirable to engage a device secured to the clamp.

Figure 18:
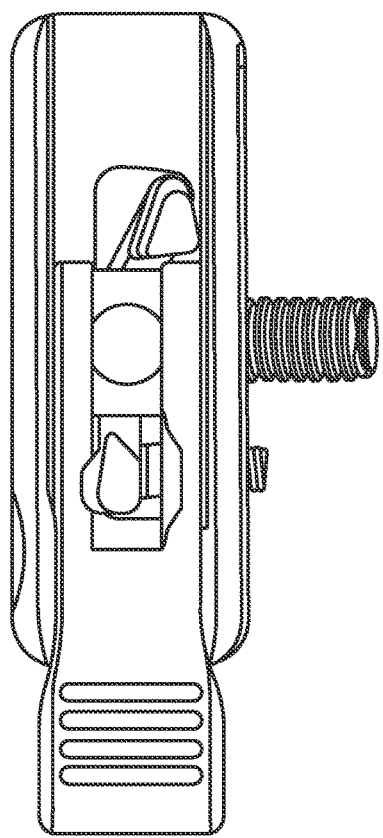
FIG. 18 illustrates the lever and clamp assembly in the sliding position.
Figure 20:
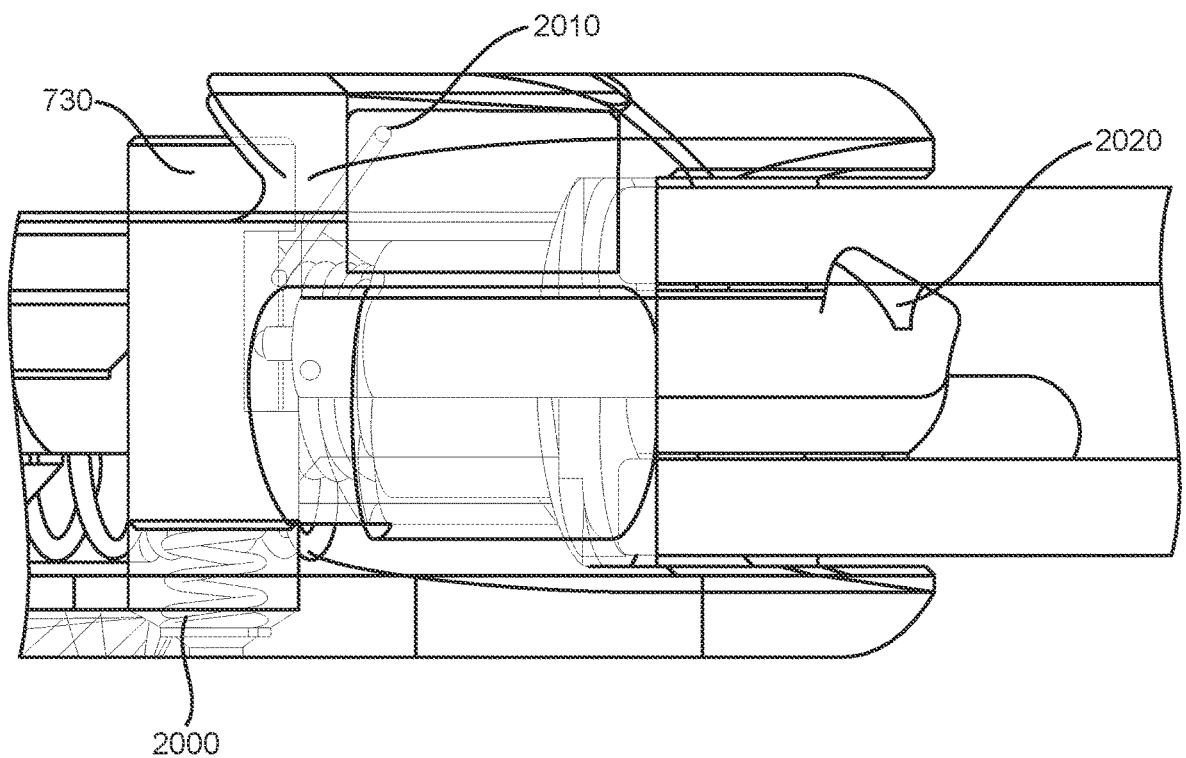
FIG. 20 illustrates a portion of a latch assembly for the clamp of FIG. 7.
Figure 21:
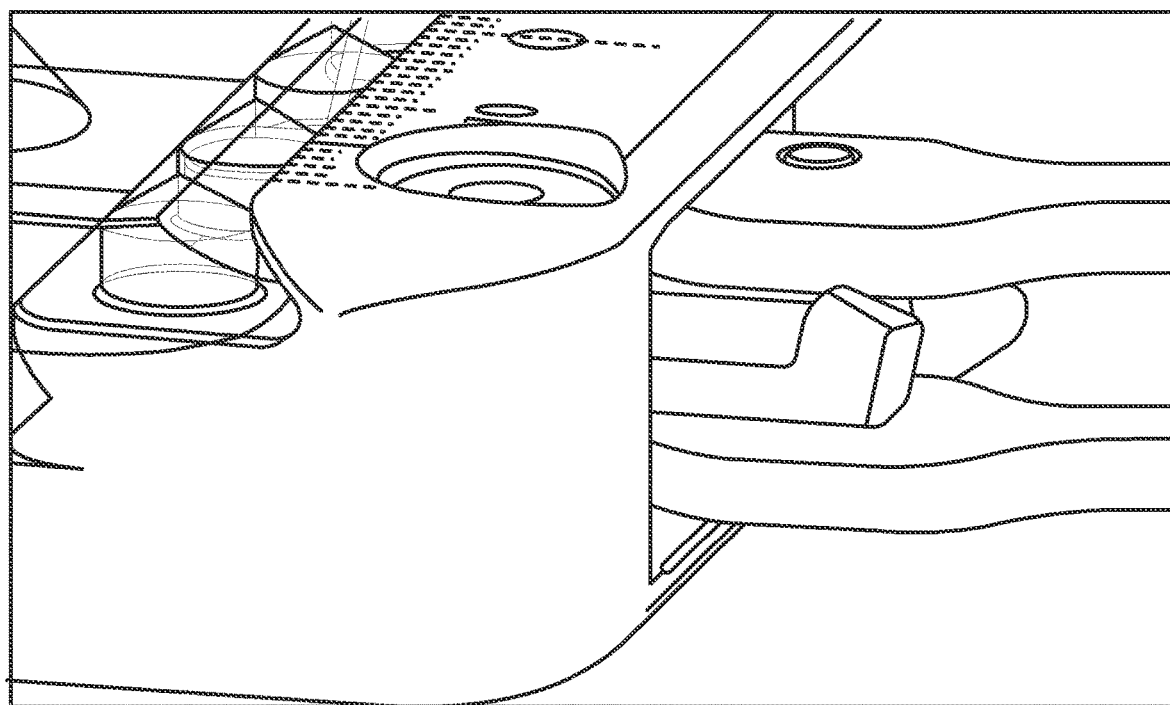
FIG. 21 illustrates a portion of a latch assembly for the clamp of FIG. 7.

Referring to FIG. 18, the lever 718 is shown in the sliding position 1400 with the latch assembly 750 extending through the elongate slit 740 and not inhibiting opening or closing of the lever 718. The latch assembly 750 in the sliding position 1400 is free to rotate, but the pin(s) 730 remains extended, such as by one or more springs, to enable to pin(s) 730 to engage a device secured to the clamp 700. Referring to FIG. 20, the latch assembly 750 may include a plurality of springs. The latch assembly 750 may include a pin spring 2000 that is biased to push the pin(s) 730 to an engaged position. The latch assembly 750 may include a torsion spring 2010 that rotates the latch assembly 750 in a clockwise direction to its resting position. The torsion spring 2010 and the latch assembly 750 preferably do not apply a positive force to engage the pin(s) 730. If, for example, the pin(s) 730 is fully depressed by an external force (e.g., a mounting plate without holes or an obstructed hole), the latch assembly cannot force the pin(s) 730 up into engagement. In other words, the latch assembly depresses the pin(s) if it is engaged, but it does not engage the pin if it is disengaged. Preferably, only the pin spring 2000 engages the pin(s) 730 to provide an extending force, as illustrated in FIG. 21.

Figure 19:
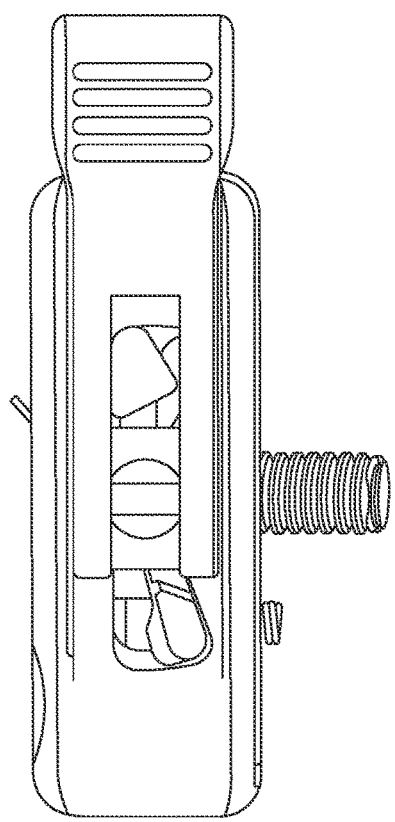
FIG. 19 illustrates the lever and clamp assembly in the opened position.
Figure 22:
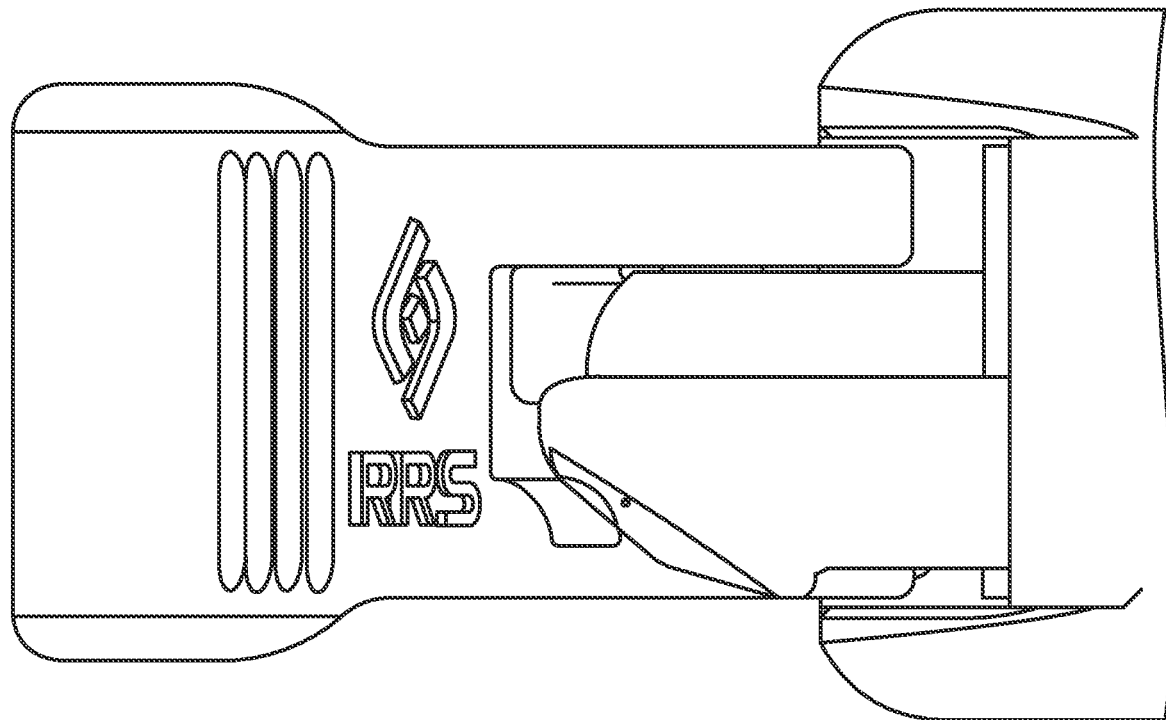
FIG. 22 illustrates a ramped surface of the latch assembly of the clamp of FIG. 7.
Figure 23:
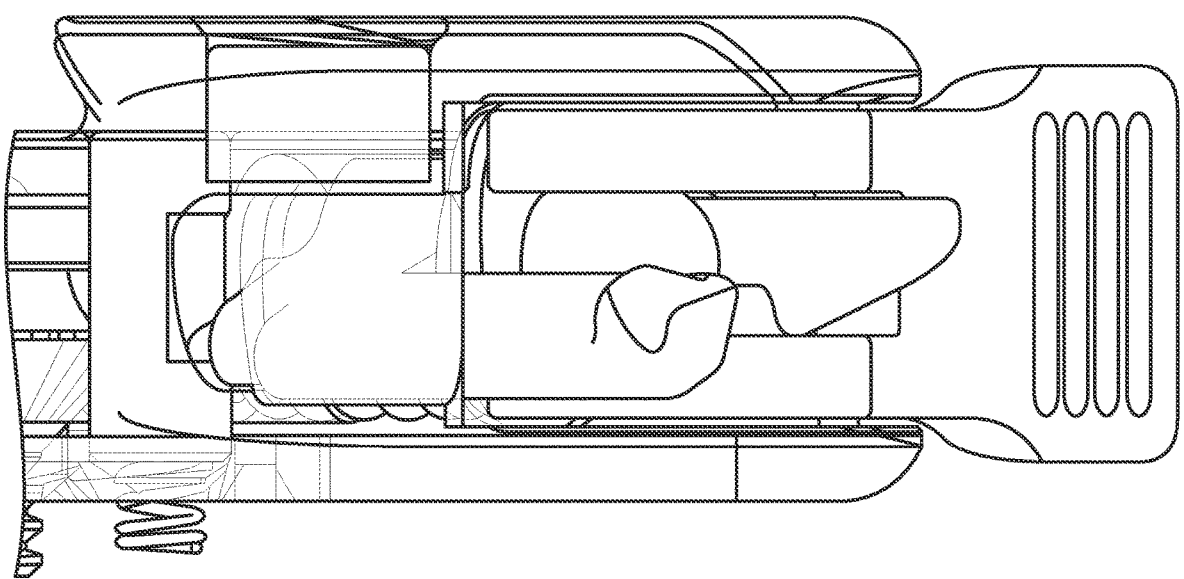
FIG. 23 illustrates a ramped surface of the latch assembly of the clamp of FIG. 7.

Referring to FIG. 19, the lever 718 is shown in the opened position 1500 with the latch assembly 750 extending through the elongate slit 740 and inhibiting closing of the lever 718. Referring to FIG. 22, and FIG. 23, when the lever 718 is rotated from the sliding position 1400 to the opened position 1500, a ramped surface on the clamp assembly 750 interfaces with a surface on the lever 718, causing the latch assembly 750 to rotate counter-clockwise and initiate disengaging the pin(s). As it may be observed, when in the opened position 1500, the pin(s) 730 do not interfere with the user's ability to insert or remove a device into the clamp 700. Also, this reduces the likelihood of inadvertent damaging the pin(s) when the mounting plate is in the clamp and the pin(s) is engaged in the mounting plate hole. If the disengagement of the pin(s) is not forced, the pin(s) may stay engaged when the lever is moved to the opened position 1500. If the user forgets to press the latch assembly to disengage the pin(s) before attempting to remove the device secured therein, any excessive movement or torque may cause the pin to bind and bend rather than releasing because the device is constrained by the pin(s). As it may be observed, by rotation of the latch assembly 750, such as in a counter-clockwise direction, the pin(s) 730 may be depressed.

Preferably, the pin(s) are positioned 10 mm offset from the shaft. Preferably, the shaft is centered in the clamp to reduce off-center clamping forces. If the pin(s) were aligned with the shaft, then there maybe conflicts and space constraints on some photography device due to the position of photography device features, such as a camera accessory mounting socket. The openings in the mounting plate or otherwise are preferably oversized to permit for some misalignment and provide sufficient space for the pin to move into the engaged position, even when the plate is in motion (such as a sliding camera or a recoiling rifle). Referring again to FIG. 9, the plate or otherwise may include a partial opening 920 that does not extend through the entire plate or otherwise.

The user may remove the clamp from the device it is secured to which aids in cleaning and maintenance. For example, the user may first rotate the lever to the opened position, then squeeze the jaw and clamp together (see FIG. 16). This results in the serrated adjustment nut 1000 being moved out of the jaw, so that the user may adjust the spring tension by rotation of the nut 1000. The nut 1000 may be removed by rotating it counter-clockwise until it is removed from the shaft. The nut may consist of a serrated nut, 4 springs, and 2 O-rings, all of which may be removed to be cleaned, lubricated, and re-installed. With the nut 1000 removed, the shaft and lever may be pulled out of the clamp and the squeezing pressure on the jaw and clamp body released. A washer may come out with the shaft and lever. The latch is retaining an expanding retaining ring. This can be rotated to an optimal positioned and popped out. The latch and torsion spring may then be removed, and then the pin and spring can be removed.

The clamp may utilize the pin to locate the cameras at the center of the lens. This may be used instead of or in combination with a laser engraved mark on the camera mounting plates, indicating where the center of the lens is. By adding an indexing hole to the bottom of the plates that receives the pin in the clamp, users can align their cameras in the clamp without relying on visual alignment only. The pin will lock the camera in the correct alignment until the pin is disengaged in the sliding position or the opened position.

The use of the pin(s) may supplement or otherwise replace the need for safety stop screws installed on the bottom of cameras. This reduces issues related to need to use screws and tools to adjust each device.

The clamp structures may further be used as a mounting structure for soft goods, such as a backpack, waist-belt, or chest harness. This is particularly appliable for wedding and event photographers, where most photographers are not using tripods but do use some way to quickly secure the camera to their person to perform another task like a lens change. It can also be useful in outdoor situations like backpacking, climbing, hiking, or hunting, where the user wants a camera at-the-ready but also wants to ensure it is secure and unable to come detached without user input.

As it may be observed, the user will be able to lock their devices into discrete positions without fear of it slipping under heavy recoil or impact. One prevalent application is to prevent slipping when the user has a rifle mounted on a tripod. The other prevalent use is for mounting bipods and other support devices.

In cinema applications, safety stop features are used. When the user has $100,000 camera setups on top of a tripod, the user wants to ensure it is highly unlikely to accidentally fall out. The clamping structure may be included in fluid heads and cinema plates, with or without discrete positions. Preferably, the structure would include long slots on the bottom of the plates to allow the users to adjust the position and balance the camera but at the end of the plate, the slot would end, inhibiting the equipment from sliding completely out of the fluid head.

There are some applications in cinema where discrete indexing is desired, however. When there are many devices that need to be aligned along the lens axis, the discrete positioning could be helpful in ensuring all the devices are aligned properly. Some cameras, for example, may have their mounting plate perpendicular to the lens axis, just like photo applications. So, using the indexing pin ensures the user has the lens aligned with the rest of the setup.

The clamping structure may be used by medical professionals for secure attachment of accessories or imaging devices, or for mounting system for ambulances or fire trucks. The clamping structure may be used for quick release vehicle mounts for fishing poles, axes, shoves, fire extinguishers, ski bindings, and snowboard biddings. The clamping system may further include the capability of locking the lever in a position with a padlock to prevent theft.

Figure 24:
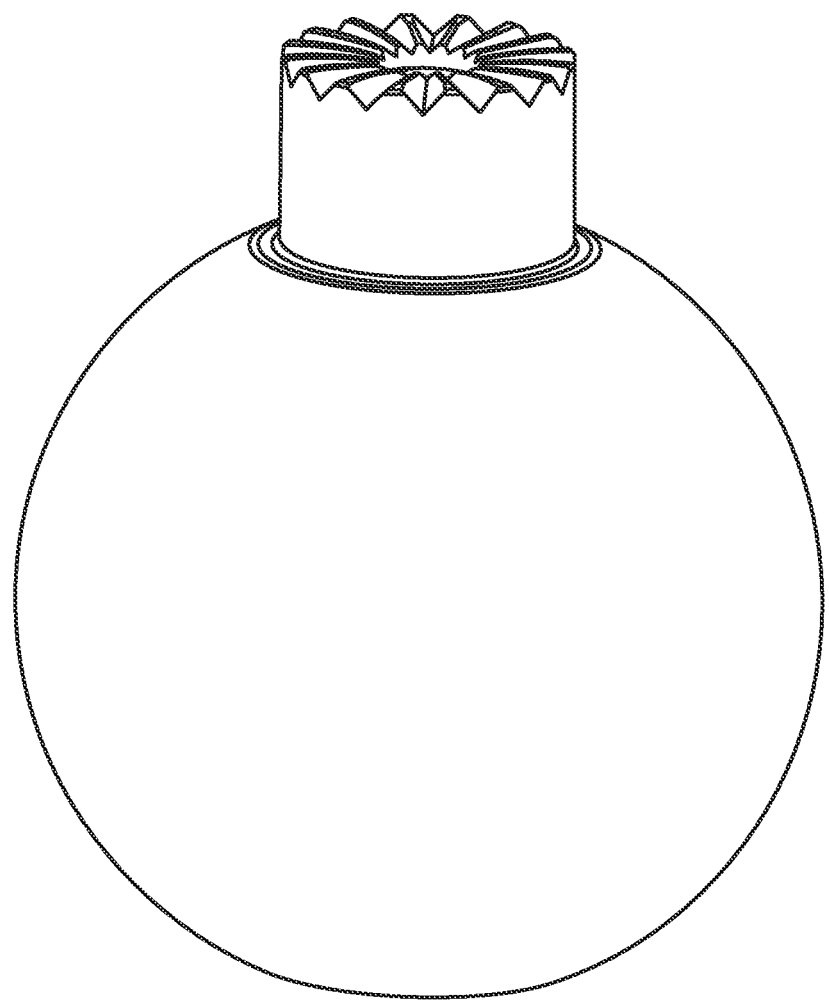
FIG. 24 illustrates a ball with a rosette for the clamp of FIG. 7.
Figure 25:
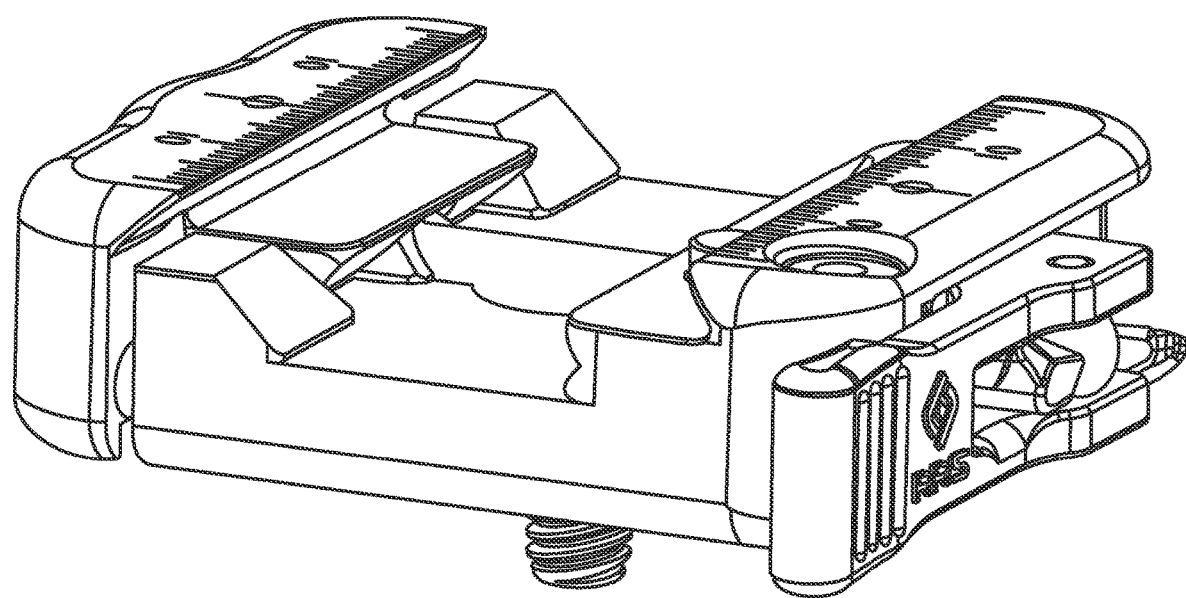
FIG. 25 illustrates a clamp assembly for the clamp of FIG. 7.
Figure 26:
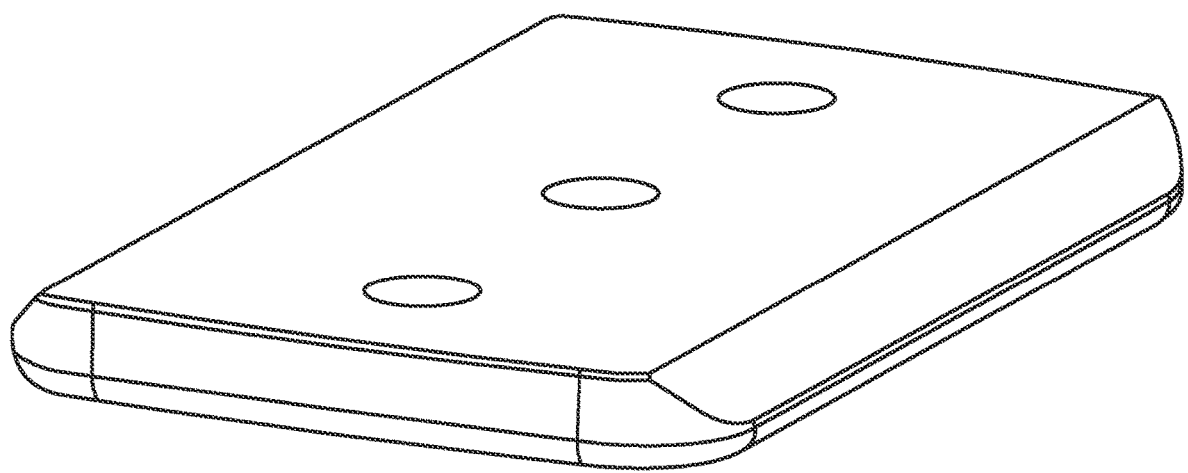
FIG. 26 illustrates a plate for the clamp of FIG. 7.
Figure 27A:
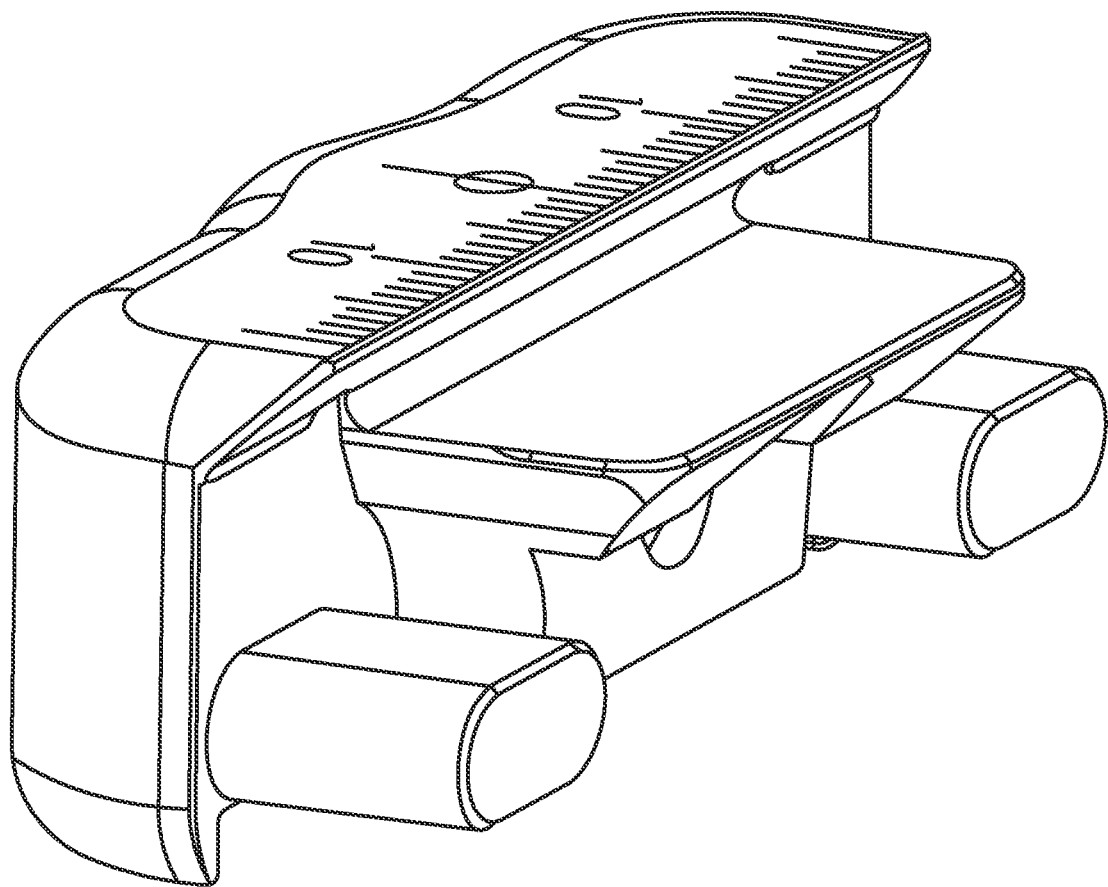
FIGS. 27A and 27B illustrate a clamp arm for the clamp of FIG. 7.
Figure 27B:
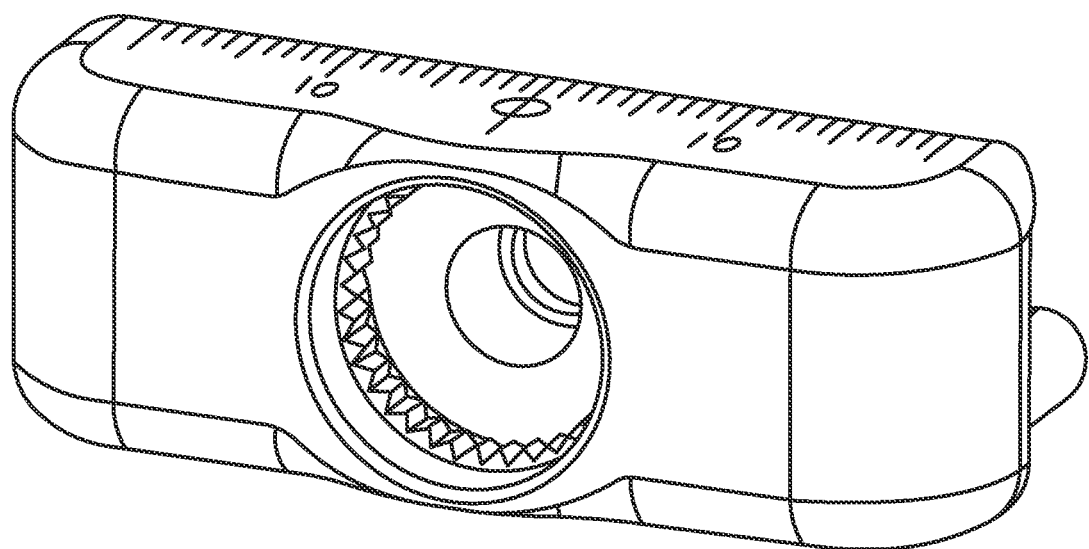
Figure 28A:
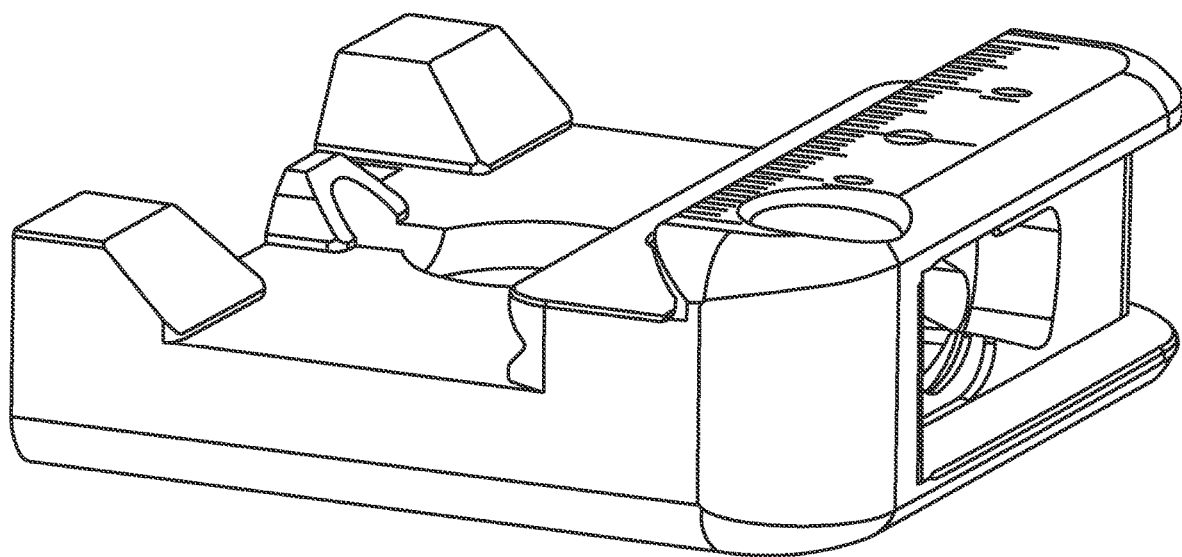
FIGS. 28A and 28B illustrate a clamp body for the clamp of FIG. 7.
Figure 28B:
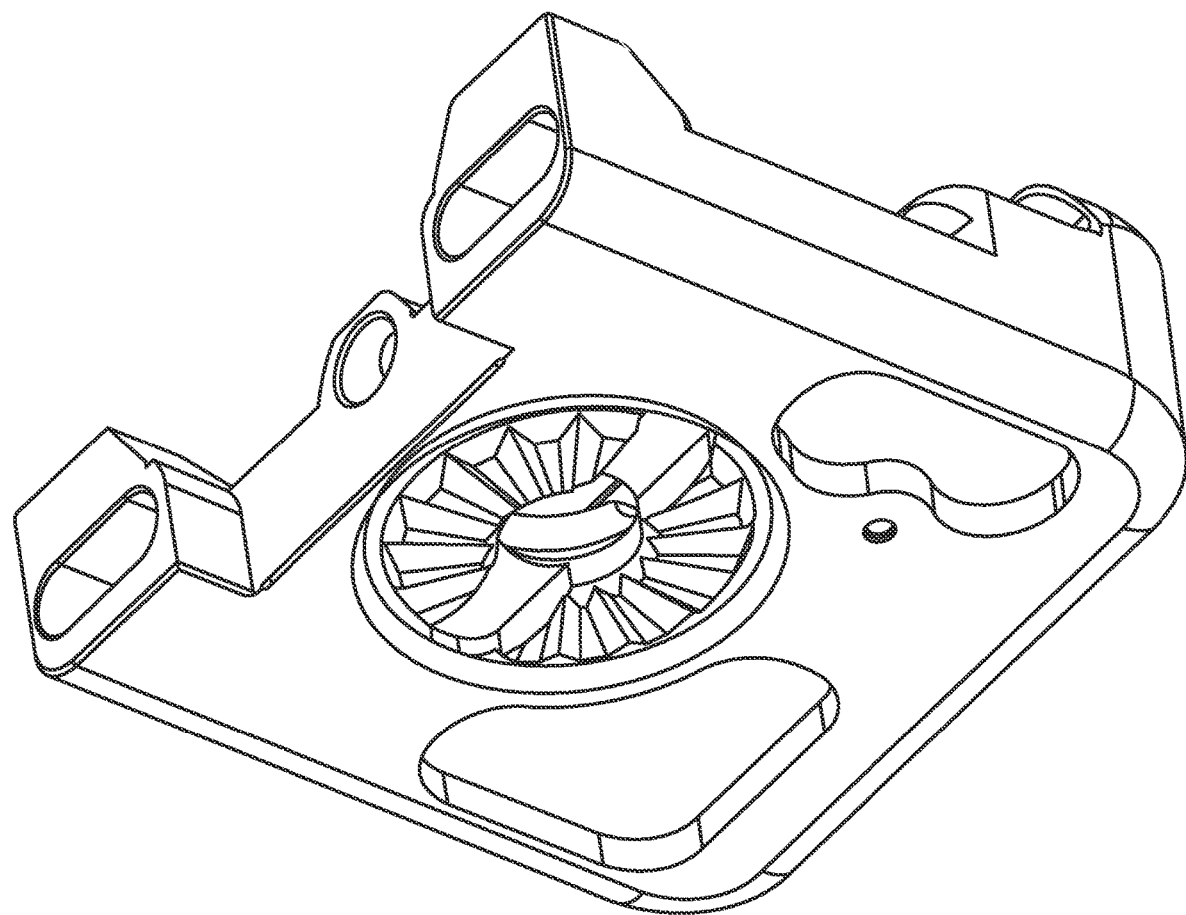
Figure 29:
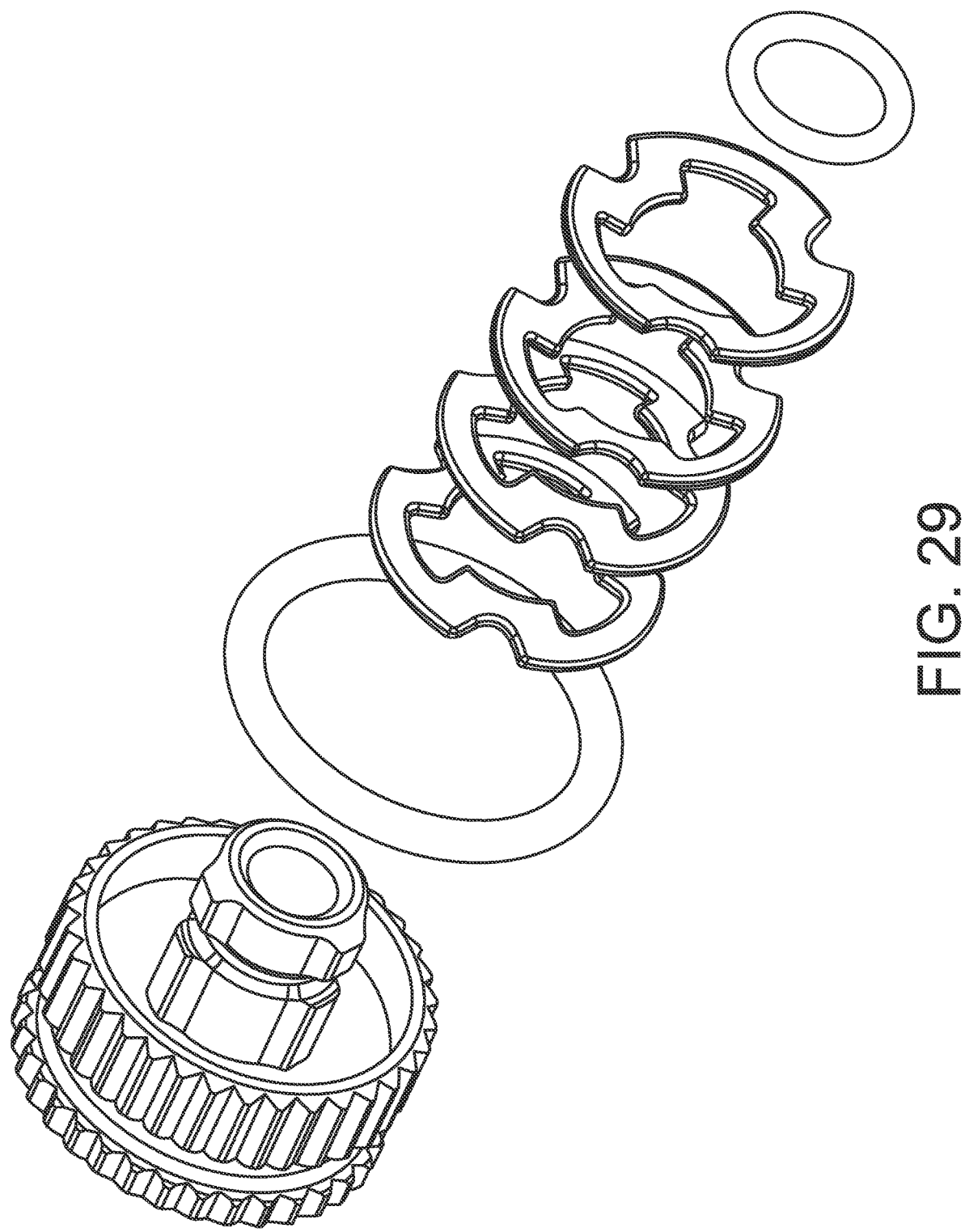
FIG. 29 illustrates a nut for the clamp of FIG. 7.
Figure 30:
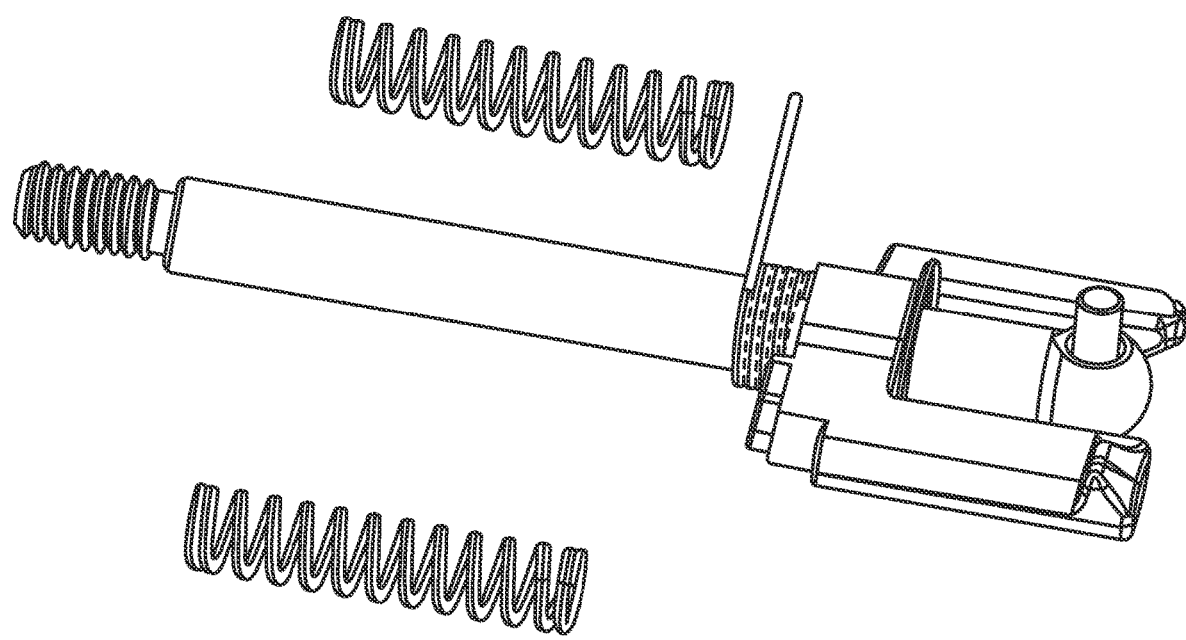
FIG. 30 illustrates portions of the clamp assembly for the clamp of FIG. 7.
Figure 31:
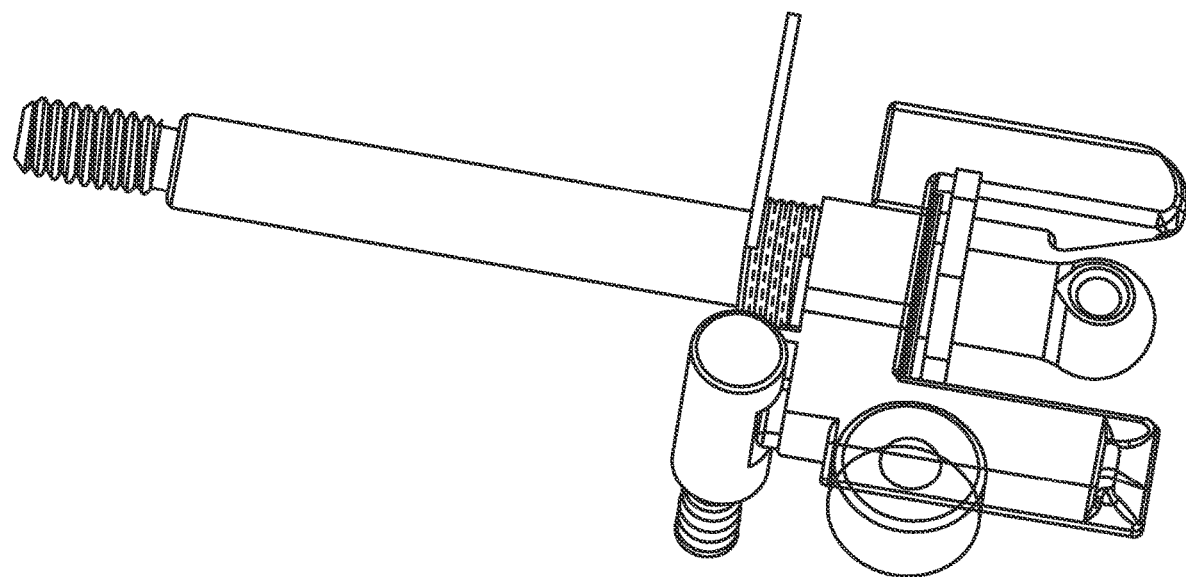
FIG. 31 illustrates portions of the clamp assembly for the clamp of FIG. 7 engaging the pin.
Figure 32:
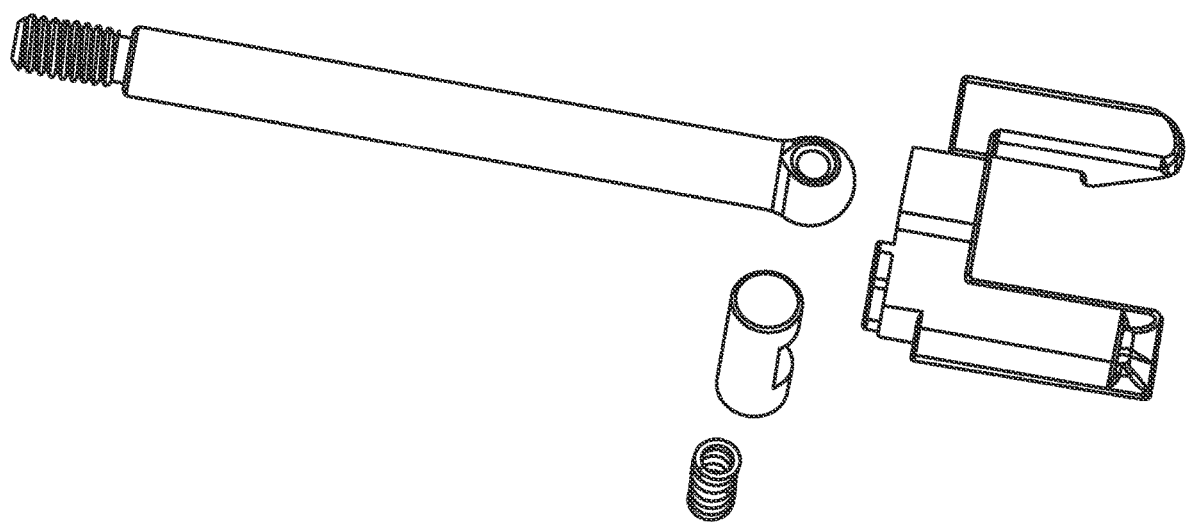
FIG. 32 illustrates portions of the clamp assembly for the clamp of FIG. 7 broken apart.

Referring to FIG. 24, the clamp may include a ball with a rosette. Referring to FIG. 25, a clamp assembly may be supported by the ball of FIG. 24. Referring to FIG. 26, a plate may be secured by the clamp assembly. Referring to FIG. 27, the clamp assembly include the clamp arm which is engageable with the body shown in FIGS. 28A and 28B. Referring to FIGS. 29A and 29B, the nut may include a serrated body, a large O-ring, a small O-ring, and a set of 4 washers. Referring to FIG. 30, the clamp assembly may include the shaft, a pair of springs to bias the clamp arm, a torsion spring, a washer, a U-shaped member with a pair of arms, and a dowel for the lever. Referring to FIG. 31, a portion of the lever assembly is illustrated. Referring to FIG. 32, an exploded portion of the lever assembly is illustrated.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

We claim:

1. An apparatus for engaging equipment to a support, said apparatus comprising:
    (a) a member defining a first channel having a first side wall capable of lateral movement with respect to a second side wall suitable for engaging said equipment therebetween;
    (b) said member defining a pair of surfaces suitable for engaging equipment thereon;
    (c) a movable member capable of causing said lateral movement;
    (d) a substantially compressible member operably interconnected between said movable member and said first side wall;
    (e) an elongate member that is selectively raisable with respect to one of said surfaces within a peripheral area defined by said one of said surfaces.

2. The apparatus of claim 1 wherein said movable member is a lever.

3. The apparatus of claim 1 wherein said member defining a second channel having a third side wall capable of lateral movement with respect to a fourth side wall suitable for engaging said equipment therebetween, wherein said first side wall and said second side wall are at a different elevation that said third side wall and said fourth side wall.

4. The apparatus of claim 1 further comprising a shaft interconnecting said first side wall on a first said member with a movable member on a second opposing side of said member.

5. The apparatus of claim 1 further comprising a nut that is rotatable to selectively offset said first side wall with respect to said second side wall.

6. The apparatus of claim 1 wherein said elongate member is biased in a raised position with respect to said one of said surfaces.

7. The apparatus of claim 5 wherein said nut defines a serrated exterior profile.

8. The apparatus of claim 7 wherein said first side wall defines a corresponding serrated interior profile.

9. The apparatus of claim 1 wherein said movable member includes a lever defining an elongate slit therein.

10. The apparatus of claim 9 further comprising a latch assembly engaging said elongate slit of said lever.

11. The apparatus of claim 1 further comprising an elongate member spring biasing said elongate member upwardly.

12. The apparatus of claim 10 wherein said latch assembly is rotationally biased in a first direction along an axis different than a rotational axis of said lever.

13. The apparatus of claim 12 wherein said latch assembly is rotatable in a first direction to selectively enable said lever to rotate.

14. The apparatus of claim 13 wherein said latch assembly is rotatable in a second direction to selectively enable said elongate member to be retracted.

15. The apparatus of claim 14 wherein said latch is free from selectively extending said elongate member when rotated in said first direction.

* * * * *